United States Patent

[11] 3,609,139

| [72] | Inventor | William J. Houlihan |
| | | Mountain Lakes, N.J. |
| [21] | Appl. No. | 812,304 |
| [22] | Filed | Apr. 1, 1969 |
| [45] | Patented | Sept. 28, 1971 |
| [73] | Assignee | Sandoz-Wander, Inc. |
| | | Hanover, N.J. |

[54] SUBSTITUTED DIBENZDIAZONINES
6 Claims, No Drawings

[52] U.S. Cl.................................................. 260/239 DD,
260/251 A, 424/244
[51] Int. Cl...................................................... A61k 27/00,
C07d 57/12

[50] Field of Search............................................ 260/239
DD

[56] References Cited
UNITED STATES PATENTS
3,243,430  3/1966  Metlesics et al. ............. 260/239

*Primary Examiner*—Alton D. Rollins
*Attorneys*—Gerald D. Sharkin, Frederick H. Weinfeldt, Robert S. Honor, Walter F. Jewell and Richard E. Vila

ABSTRACT: Dibenzdiazonines, e.g., 5-phenyl-7H-dibenz[b,g] [1,5] diazonine, have been prepared which are useful as CNS stimulants.

SUBSTITUTED DIBENZDIAZONINES

This invention relates to novel heterocyclic compounds. More specifically, it relates to novel substituted dibenz[b,g][1,5]diazonines, intermediates therefor, acid addition salts thereof, and processes for their preparation. The compounds of the present invention may be represented by the formula

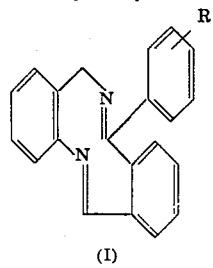

(I)

Where R represents hydrogen, chloro or fluoro, provided the chloro or fluoro radical is on the meta or para carbon on the phenyl ring.

The process for preparing the compounds of formula (I) may be represented as follows.

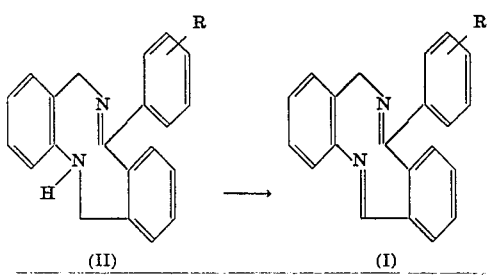

(II) → (I)

where R is as defined above.

The diazonines of formula (I) (or an acid addition salt thereof) are prepared from the compounds of formula (II) (or an acid addition salt thereof) by dehydrogenating a compound of formula (II) in the presence of a platinum group metal, preferably platinum or palladium, as catalyst. This treatment may be continued for a period preferably of about 15–35 hours and preferably at a temperature of about 20°–45° C. The process is conducted in a solvent such as lower alkanols, e.g., ethanol or isopropanol, and may be accelerated using conventional methods such as agitation of the reaction mixture. The platinum group metal may be unsupported or supported on such conventional carriers as alumina or carbon. The compounds of formula (I) may be recovered using conventional techniques.

The compounds of formula (II) may be prepared from the compounds of formula (III) by ring cleavage as indicated below.

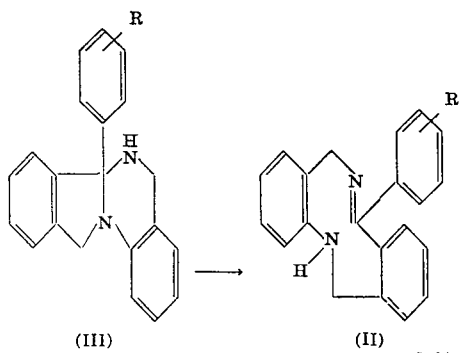

(III) → (II)

R is as defined above.

This reaction may be conducted by contacting the compounds of formula (III) in solvent with silica gel, conveniently by adding the compounds to a column of silica gel. The resulting reaction may be allowed to continue preferably for about 15 to 30 hours preferably at about 20°–35° C. The solvents which may be used include chloroform, methylene chloride and the like. The product (II) may be recovered using conventional techniques, such as by developing a silica gel column with further solvent and recrystallizing the resulting product from methanol.

Neither solvents used, reaction temperatures, nor reaction times are critical in obtaining compounds (I) or (II).

The compounds of formula (III) are prepared from the compounds of formula (IV) as indicated below by treatment with lithium aluminum hydride in solvent such as tetrahydrafuran at about the reflux temperature of the system.

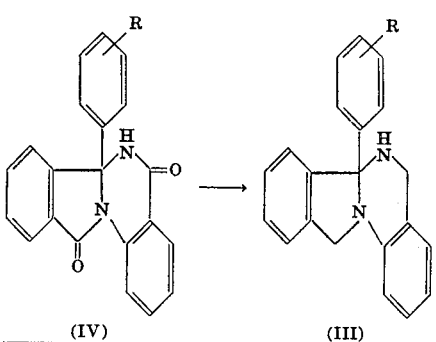

(IV) → (III)

R is as defined above.

The compounds of formula (IV) are in turn prepared from the appropriately substituted 2-carboxybenzophenone or acid chloride and anthranilamide at about 60° C. in dimethylformamide. The anthranilamide and 2-carboxybenzophenone starting materials are known and may be prepared using procedures disclosed in the literature.

As indicated above, the compounds of formulas (I) and (II) exist in acid addition salt form. Both the free base and acid addition salt form may be prepared from one another using conventional techniques, e.g., salification of the free base or treating the salt in solution with a base, e.g., sodium carbonate.

The compounds of formula (I) are useful because they possess pharmacological activity in animals. More particularly the compounds possess CNS stimulant activity and may be used as antidepressants as indicated by their activity in mice given 15 mg./kg. I.P. of active compound and tested to determine reversal of reserpine hypothermia basically as indicated by P. S. J. Spencer, Antagonism of Hypothermia in the Mouse by Antidepressants, in Antidepressant Drugs, pp. 194–204, Eds. Garrantine and Dukes, Excerpta Medica Foundation, 1967.

These compounds (I) may be combined with a pharmaceutically acceptable carrier or adjuvant and may be administered orally or parenterally. The dosage will vary depending upon the mode of administration utilized and the particular compound employed.

Furthermore, the compounds of formula (I) may be similarly administered in the form of their nontoxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzene-sulfonate and the like.

In general, satisfactory results are obtained when these compounds are administered at a daily dosage of about 0.5 milligrams to about 50 milligrams per kilogram of animal body weight. This daily dosage is preferably administered two to four times a day, or in sustained release form. For most large mammals, the total daily dosage is from about 30 milligrams to about 500 milligrams. Dosage forms suitable for internal use comprise from about 7 milligrams to about 250 milligrams of the active compound in intimate admixture with a solid or liquid pharmaceutically acceptable carrier or diluent.

A representative formulation suitable for oral administration is a tablet prepared by standard tabletting techniques which contains the following.

| Ingredient | Parts by Weight |
|---|---|
| 5-phenyl-7H-dibenz[b,g][1,5] diazonine | 5 |
| tragacanth | 2 |
| lactose | 84.5 |
| corn starch | 5 |
| talcum | 3 |
| magnesium stearate | 0.5 |

The following examples are provided for the purpose of illustration and not by way of limitation. They are not intended so as to limit the scope of the invention as defined in the appended claims.

EXAMPLE 1

12,13-dihydro-5-phenyl-7H-dibenz[b,g][1,5]diazonine

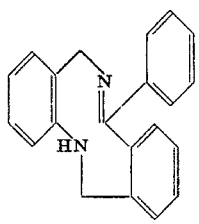

Anthranilamide (10 g.), 15 g. of 2-carboxybenzophenone acid chloride and 5 ml. of pyridine are dissolved in 100 ml. of dimethylformamide. The resulting solution is stirred at 60° C. for 48 hours. The solvent is removed in vacuo and the resulting solid is crystallized from methanol water to provide 6a-phenyl-6,6a-dihydroisoindolo[2,1-a]quinazolin-5,11-dione; melting point greater than 300° C. Lithium aluminum hydride (3.6 mole) is dissolved in 1500 ml. of absolute tetrahydrofuran in a flask equipped with a stirrer and water-cooled soxhlet extractor. The extraction cup is charged with 0.17 moles of the above-mentioned dione and the system is blanketed with nitrogen, stirred and refluxed for seven days. The resultant solution is cooled in an ice bath, and the cooled product is admixed with 200 ml. of ethylacetate. The resulting material is then admixed with 37ml. of 2N sodium hydroxide and then 40 ml. of water. The solids are filtered off and the filtrate is concentrated in vacuo. The residue is crystallized from methanol to obtain a product having a melting range of 173°–240° C. This product is admixed with 2N hydrochloric acid, the insoluble fraction is filtered off, and the filtrate is neutralized with 2N sodium hydroxide. The precipitated solid is filtered off and recrystallized from dimethylformamide-methanol-water (1:1:1) to obtain 6a-phenyl-5,6,6a,11-tetrahydroisoindolo[2,1-a]quinazoline, melting point 149°–151°C.

A solution of 1.0 g. of 6a-phenyl-5,6,6a-11-tetrahydroisoindolo[2,1-a]quinazoline in 20 ml. of chloroform is added to a column of 20 g. of silica gel in 100 ml. of chloroform and then allowed to stand for 20 hours at room temperature. The column is then developed with additional chloroform to give 12,13-dihydro-5-phenyl-7H-dibenz[b,g][1,5]diazonine; melting point 182°–183° C.

When the above procedure is carried out and 6a-p-chlorophenyl-5,6,6a,11-tetrahydroisoindolo[2,1-a]quinazoline or 6a-m-fluorophenyl-5,6,6a11-tetrahydroisoindolo[2,1-a]quinazoline is used in place of 6a-phenyl-5,6,6a,11-tetrahydroisoindolo[2,1-a]quinazoline, there is obtained 12,13-dihydro-5-p-chlorophenyl-7H-dibenz[b,g][1,5]diazonine or 12,13-dihydro-5-m-fluorophenyl-7H-dibenz[b,g][1,5]diazonine, respectively.

EXAMPLE 2

5-phenyl-7H-dibenz [b, g] [1,5] diazonine

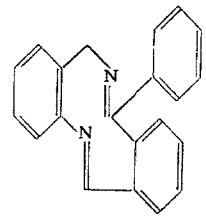

A mixture of 2.0 g. of 12,13-dihydro-5-phenyl-7H-dibenz[b,g][1,5]diazonine, 500 ml. of isopropanol and 0.2 g. of 10 percent Pt/C are placed in a sealed pressure bottle and mechanically shaken at room temperature for 26 hours. The catalyst is filtered off and the solvent is removed in vacuo. The residue is crystallized from tetrahydrofuran-ether-pentane (1:1:1) to give 5-phenyl-7H-dibenz [b,g][1,5]diazone melting point 168°–173° C.

When the above process is carried out and 12,13-dihydro-5-p-chlorophenyl-7H-dibenz[b,g][1,5]diazonine or 12,13-dihydro-5-m-fluorophenyl-7H-dibenz[b,g][1,5]diazonine is used in place of 12,13-dihydro-5-phenyl-7H-dibenz[b,g][1,5]diazonine, there is obtained 5-p-chlorophenyl-7H-dibenz[ ]diazonine or 5-m-fluorophenyl-7H-dibenz[b,g][1,5]diazonine, respectively.

What is claimed is:

1. A compound of the formula

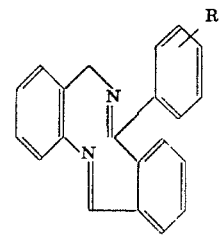

where R represents hydrogen, or m- or p- chloro or fluoro, or a nontoxic pharmaceutically acceptable acid addition salt thereof.

2. The compound of claim 1 which is 5-phenyl-7H-dibenz b,g.][a-1,5]diazonine.

3. A compound of the formula

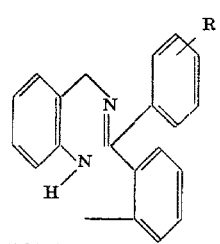

where R represent hydrogen or m- or p- chloro or fluoro, or an acid addition salt thereof.

4. The compound of claim 3 which is 12,13-dihydro-5-phenyl-7H-dibenz[b,g][1,5]diazonine.

5. A process for preparing a compound of claim 1 which comprises contacting a compound of the formula

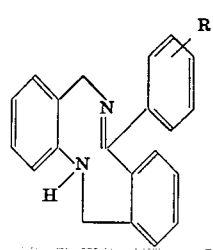

or an acid addition salt thereof,
with a platinum group metal in inert solvent,
where R represent hydrogen or *m*- or *p*- chloro or fluoro.

6. A process for preparing a compound of claim 3 which comprises contacting a compound of the formula

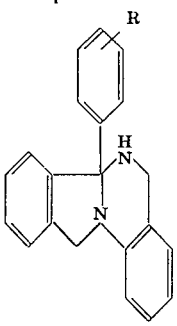

with silica gel in inert solvent,
where R represents hydrogen or *m*- or *p*- chloro or fluoro.